(12) United States Patent
Kucherawy

(10) Patent No.: US 7,146,402 B2
(45) Date of Patent: Dec. 5, 2006

(54) E-MAIL SYSTEM PROVIDING FILTERING METHODOLOGY ON A PER-DOMAIN BASIS

(75) Inventor: Murray Kucherawy, San Francisco, CA (US)

(73) Assignee: Sendmail, Inc., Emeryville, CA (US)

( * ) Notice: Subject to any disclaimer, the term of this patent is extended or adjusted under 35 U.S.C. 154(b) by 859 days.

(21) Appl. No.: 09/945,130

(22) Filed: Aug. 31, 2001

(65) Prior Publication Data

US 2003/0050988 A1    Mar. 13, 2003

(51) Int. Cl.
*G06F 15/16* (2006.01)
*G06F 17/00* (2006.01)

(52) U.S. Cl. .......................... 709/206; 709/227; 726/1
(58) Field of Classification Search ........ 709/206–207, 709/227–229; 713/200–202; 726/1
See application file for complete search history.

(56) References Cited

U.S. PATENT DOCUMENTS

| | | | |
|---|---|---|---|
| 5,263,157 A | 11/1993 | Janis | 707/9 |
| 5,765,033 A | 6/1998 | Miloslavsky | 709/206 |
| 5,768,505 A | 6/1998 | Gilchrist et al. | 709/201 |
| 5,835,727 A | 11/1998 | Wong et al. | 709/238 |
| 5,884,046 A | 3/1999 | Antonov | 709/238 |
| 5,920,697 A | 7/1999 | Masters et al. | 709/219 |
| 6,101,531 A | 8/2000 | Eggleston et al. | 709/206 |
| 6,105,027 A | 8/2000 | Schneider et al. | 707/9 |
| 6,131,095 A | 10/2000 | Low et al. | 707/10 |
| 6,282,565 B1 * | 8/2001 | Shaw et al. | 709/206 |
| 6,374,292 B1 * | 4/2002 | Srivastava et al. | 709/206 |
| 6,438,215 B1 | 8/2002 | Skladman et al. | 379/67.1 |
| 6,438,597 B1 * | 8/2002 | Mosberger et al. | 709/227 |
| 6,442,589 B1 | 8/2002 | Takahashi et al. | 709/203 |
| 6,704,772 B1 * | 3/2004 | Ahmed et al. | 709/207 |
| 6,779,021 B1 * | 8/2004 | Bates et al. | 709/206 |
| 6,816,903 B1 * | 11/2004 | Rakoshitz et al. | 709/226 |
| 2003/0167250 A1 * | 9/2003 | Sash | 707/1 |

OTHER PUBLICATIONS

Lorrie Faith Cranor and Brian A. LaMacchia. "Spam!". Communications of the ACM, Aug. 1998. vol. 4, No. 8, pp. 74-83.*

(Continued)

*Primary Examiner*—Jason Cardone
*Assistant Examiner*—Jeffrey R. Swearingen
(74) *Attorney, Agent, or Firm*—John A. Smart

(57) ABSTRACT

An e-mail system is described that includes a flow control filter, which is particularly suited for filtering on a per-domain (host) basis. During processing of incoming e-mail, each child MTA process created to handle a particular new connection connects to a flow control filter service, so that it can interact with the service during arrival of a message. This interaction provides a complete description of the incoming client, including IP address and host name, as well as the complete SMTP interaction. Since the flow control filter service monitors all children processes, it attains a global view of traffic flowing through the system. By virtue of its global view, the flow control filter service can track information on a per domain basis, including total volume of e-mail received from a particular domain over a given period of time. Since the knowledge lost by the forking process is captured by the flow control filter service, the service is in a position to enforce policy-based rules, including placing restrictions on child processes, based on the per-domain tallies encountered.

53 Claims, 10 Drawing Sheets

OTHER PUBLICATIONS

Jonathan B. Postel. RFC 821: Simple Mail Transfer Protocol. Information Sciences Institute, University of Southern California. Aug. 1982.*

Apache HTTP Server Configuration Files. Feb. 2001. http://web.archive.org/web/20010208104821/httpd.apache.org/docs/configuring.html.*

Dierks, T. et al., RFC2246; The TLS Protocol—Version 1.0, Internet Engineering Task Force, Jan. 1999.

Hoffman, P., RFC2487: SMTP Service Extension for Secure SMTP over TLS, Internet Engineering Task Force, Jan. 1999.

Crispin, M., RFC2061: IMAP4 Compatibility with IMAP2BIS, Internet Engineering Task Force, Dec. 1996.

Crispin, M., RFC2060: Internet Message Access Protocol—Version 4 (rev 1), Internet Engineering Task Force, Nov. 1996.

Myers, J., RFC2033: Local Mail Transfer Protocol, Internet Engineering Task Force, Oct. 1996.

Myers, J., RFC1725: Post Office Protocol—Version 3, Internet Engineering Task Force, Nov. 1994.

Braden, R. (Editor), RFC1123: Requirements for Internet Hosts—Application and Support, Internet Engineering Task Force, Oct. 1989.

Rose, M., RFC1081: Post Office Protocol—Version 3, Internet Engineering Task Force, Nov. 1988.

Partridge, Craig, RFC974: Mail Routing and the Domain System, Internet Engineering Task Force, Jan. 1986.

Butler, M. et al., RFC937: Post Office Protocol—Version 2, Internet Engineering Task Force, Feb. 1985.

Postel, Jonathan, B., RFC821: Simple Mail Transfer Protocol, Information Sciences Institute, University of Southern California, Aug. 1982.

SENDMAIL, Sendmail for NT: User Guide, Sendmail (Part No.: DOC-SMN-300-WNT-MAN-0999), 1999.

* cited by examiner

T0: VARIABLE A=1
T1: FORK CHILD 1
T2: PARENT CHANGES VALUE OF VARIABLE A TO 2
T3: FORK CHILD 2

E-MAIL SYSTEM PROVIDING FILTERING METHODOLOGY ON A PER-DOMAIN BASIS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to electronic mail (e-mail) systems and, more particularly, to improved methodology for filtering e-mail messages sent from various host domains.

2. Description of the Background Art

Today, electronic mail or "e-mail" is a pervasive, if not the most predominant, form of electronic communication. FIG. 1A illustrates the basic architecture of a typical electronic mail system 10. At a high level, the system includes a mail server connected over a network to various e-mail "clients," that is, the individual users of the system. More specifically, the system 10 includes one or more clients 11 connected over a network to at least one SMTP (Simple Mail Transfer Protocol) server or "Mail Transport Agent" (MTA) 12a for routing e-mail. Users write, send, and read e-mail via Mail User Agents (MUA), such as Microsoft Outlook™, present at each client (computer). To send e-mail, an MUA connects to an MTA which receives the e-mail and routes it to another MTA. An intermediary MTA might forward the e-mail to yet another MTA until the e-mail reaches the destination system, where the e-mail is stored in a mailbox accessible by the recipient.

A typical e-mail delivery process is as follows. In the following scenario, Larry sends e-mail to Martha at her e-mail address: martha@example.org. Martha's Internet Service Provider (ISP) uses an MTA, such as provided by Sendmail® for NT, available from Sendmail, Inc. of Emeryville, Calif. (With a lower case "s," "sendmail" refers to Sendmail's MTA, which is one component of the Sendmail® Switch product line.)

1. Larry composes the message and chooses Send in Microsoft Outlook Express (a "Mail User Agent" or MUA). The e-mail message itself specifies one or more intended recipients (i.e., destination e-mail addresses), a subject heading, and a message body; optionally, the message may specify accompanying attachments.
2. Microsoft Outlook Express queries a DNS server for the IP address of the local mail server running sendmail. The DNS server translates the domain name into an IP address, e.g., 10.1.1.1, of the local mail server.
3. Microsoft Outlook Express opens a TCP/IP connection to the local mail server running sendmail. The message is transmitted to a second sendmail server using the SMTP protocol (e.g., as defined in RFC 821).
4. sendmail queries a DNS server for the MX record of the destination domain, i.e., example.org. The DNS server returns a hostname (e.g., mail.example.org) for the destination domain. sendmail queries a DNS server for the A record of mail.example.org (i.e., the IP address). The DNS server returns an IP address of, for example, 127.118.10.3.
5. sendmail opens a TCP/IP connection to the remote mail server providing e-mail service for example.org, which is also running sendmail. The message is transmitted to the remote sendmail mail server using the SMTP protocol.
6. sendmail delivers Larry's message for Martha to the local delivery agent. It appends the message to Martha's mailbox. By default, the message is stored in (e.g., using a sample file path on a UNIX system): /var/spool/mail/martha.
7. Martha has her computer dial into her ISP.
8. Martha chooses "Check Mail" in Eudora.
9. Eudora opens a POP3 (Post Office Protocol version 3, defined in RFC 1725) connection with the POP3 (incoming mail) server. Eudora downloads Martha's new messages, including the message from Larry.
10. Martha reads Larry's message.

The MTA, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as Request For Comment documents (RFCs). Typically, the mail server or MTA must temporarily store incoming and outgoing messages in a queue, the "mail queue." Actual queue size is highly dependent on one's system resources and daily volumes.

MTAs, such as the commercially-available Sendmail® MTA, perform three key mail transport functions:

1. Route mail across the Internet to an MTA serving a different network or "domain" (since many domains can and do exist in a single network);
2. Relay mail to another MTA (e.g., MTA 12b on FIG. 1A) on a different subnet within the same network;
3. Transfer mail from one host or server to another on the same network subnet.

To perform these functions, an MTA accepts messages from other MTAs or MUAs, parses addresses to identify recipients and domains, resolves aliases, fixes addressing problems, copies mail into a queue on its hard disk, tries to process long and hard-to-pass messages, and notifies the sender when a particular task cannot be successfully completed. The MTA does not store messages (apart from its queue) or help users access messages. It relies on other mail system components, such as message delivery agents, message stores and mail user agents (MUAs), to perform these tasks. These additional components can belong to any number of commercial or free products (e.g., POP3 or IMAP servers, Microsoft Exchange, IBM Lotus Notes, Netscape, cc:Mail servers, or the like). Because of its central role in e-mail systems, however, the MTA often serves as the "glue" that makes everything appear to work together seamlessly.

The overall process may be summarized as follows. E-mail is routed via SMTP servers, the so-called "Mail Transport Agents" (MTA). Users write, send, and read e-mail via Mail User Agents (MUA). To send e-mail, an MUA connects to an MTA, which receives the e-mail and routes it to another MTA. An intermediary MTA might forward the e-mail to yet another MTA until the e-mail reaches the destination system, where the e-mail is stored in a mailbox accessible by the recipient.

For further description of e-mail systems, see e.g., *Sendmail® for NT User Guide*, Part Number DOC-SMN-300-WNT-MAN-0999, available from Sendmail, Inc. of Emeryville, Calif., the disclosure of which is hereby incorporated by reference. Further description of the basic architecture and operation of e-mail systems is available in the technical and trade literature, see e.g., the following RFC (Request For Comments) documents:

| | |
|---|---|
| RFC 821 | Simple Mail Transfer Protocol (SMTP) |
| RFC 822 | Standard for the Format of ARPA Internet Text Messages |
| RFC 974 | Mail Routing and the Domain System |
| RFC 937, RFC 1081 | Post Office Protocol version 3 (POP3) |
| RFC 1123 | Requirements for Internet Hosts -- Application and Support |
| RFC 1725 | Post Office Protocol version 3 (POP3) |
| RFC 2033 | Local Mail Transfer Protocol (LMTP) |
| RFC 2060, RFC 2061 | Internet Message Access Protocol (IMAP) |
| RFC 2246 | The TLS Protocol, version 1.0 |
| RFC 2487 | SMTP Service Extension for Secure SMTP over TLS |

RFCs are numbered Internet informational documents and standards widely followed by commercial software and freeware in the Internet and UNIX communities. The RFCs are unusual in that they are floated by technical experts acting on their own initiative and reviewed by the Internet at large, rather than formally promulgated through an institution such as ANSI. For this reason, they remain known as RFCs even once they are adopted as standards. The above-listed RFC documents are currently available via the Internet (e.g., at www.ietf.org/rfc), the disclosures of which are hereby incorporated by reference.

During operation of the Sendmail MTA, a listening process operates to detect requests for new connections. When a request for a new connection arrives, Sendmail makes a new copy or instance of itself through a "forking" operation. The "forked" or new process deals with the new connection exclusively. Thus, at the conclusion of the forking operation two processes exist: a listening process to detect requests for new connections, and a forked process which was created for the purpose of exclusively handling a particular new connection. This forking operation may be repeated to spawn other child processes, each one for exclusively handling a particular new connection.

Each child process that is created has no knowledge of the other child processes (i.e., no memory access to the data structures of the other child processes). This lack of knowledge of other child processes leads to system vulnerability. For example, the child processes cannot detect that the system is being "slammed" by many connections from a particular host. In this scenario, only the parent process (i.e., the process spawning the child processes) would be able to know (i.e., be able to maintain information) about the source of all of the connections to the system. Once a forking operation occurs, there is no interprocess communication between the child processes that would allow these processes to detect the foregoing slamming scenario.

FIG. 1B illustrates this problem in further detail. In the figure, Parent process 101 contains a variable A having an initial value of 1 (i.e., at Time t0). Suppose, at Time T1, a child process, Child 1 (shown at 105), is created using the forking operation. At the instance that Child 1 is created, the entire memory space of the Parent is copied to Child 1. Thus, at Time T1, Child 1 also contains a variable A having a value of 1, as shown. Suppose, at Time T2, that the Parent process 101 changes the value of the variable A to 2. The value of the variable A in Child 1 (105) is not changed, as the two processes are now separate. Proceeding with the example, at Time T3, Child 2 (shown at 107) is created, again using the forking operation. As before, the newly created Child process receives a copy of the then-current copy of the memory space of the Parent. Thus, Child 2 (107) contains a variable A having a value of 2, as shown. Note in particular that the first Child process, Child 1, has no knowledge that the current value of A (whatever significance it may have) in the parent is now 2. The second Child process, Child 2, on the other hand, does know that the current value of A in the parent is 2, by virtue of the fact that Child 2 was created at a later point in time (i.e., Time T3).

Without the establishment of interprocess communication (IPC) between the processes (e.g., shared memory, UNIX-style pipes, or the like), there is no knowledge shared among the processes about the current state of each process' data. In the context of an e-mail system, if there are several connections coming from a single host (for which the Parent process has created several Child processes), there is no shared knowledge among the processes to indicate which process is handling what connection. Thus, the system cannot readily determine that, for example, it may be handling ten incoming connections for a single domain (e.g., AOL.com). At the same time, however, the system may in fact benefit from identifying that scenario so that the system can moderate usage of its resources by various domains. For instance, if a particular domain is hogging the resources of the system (e.g., "slamming" the system with a multitude of e-mail messages), the system would want to identify that situation and take corrective action.

To date, efforts at addressing the foregoing problem have not provided a domain-specific solution and, therefore, have been sub-optimal. For example, existing e-mail systems may be configured to limit the number of child processes created at a given instance in time. That approach, however, simply provides a general limit on system resources. The approach does not address over-utilization or abuse of system resources by a particular domain.

Given the ever-increasing reliance on e-mail as a preferred medium for business and personal communication, there is much interest in improving the performance and reliability of e-mail systems. Accordingly, there is a need for an e-mail system that incorporates methodology for moderating usage of its resources on a per-domain basis. The present invention fulfills this and other needs.

Glossary fork: Refers to UNIX (or UNIX-like)fork( ) function is used to create a new process from an existing process. The new process is called the child process, and the existing process is called the parent. The child process inherits from the parent: process credentials (real/effective/saved UIDs and GIDs) environment, stack, memory, open file descriptors, close-on-exec flags, signal handling settings, scheduler class, process group ID, session ID, current working directory, root directory, file mode creation mask, resource limits, and controlling terminal. Unique to the child (i.e., not inherited): process ID, different parent process ID, own copy of file descriptors and directory streams, and own process, text, data and other memory locks.

MTA: Short for Mail Transport Agent (also sometimes referred to as Mail Transfer Agent, Message Transport Agent, or Message Transfer Agent); that part of a mail delivery system that routes between its origin (the sending user and the program used to create mail) and its destination (the agent which writes mail into mailboxes).

SMTP: Short for Simple Mail Transfer Protocol, a protocol for sending e-mail messages between servers. Most e-mail systems that send mail over the Internet use SMTP to send messages from one server to another; the messages can then be retrieved with an e-mail client using either POP or IMAP. Further description of SMTP may be found in RFC 821 (and subsequent RFC 2821), the disclosure of which is hereby incorporated by reference. Copies of the foregoing RFCs may be found on the Internet at www.faqs.org/rfcs.

spam/spamming: Spam is unsolicited junk email. Spamming is the act of sending spam (usually in large quantities).

TCP: Stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., RFC 793, the disclosure of which is hereby incorporated by reference.

TCP/IP: Stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., RFC 1180: A TCP/IP Tutorial, the disclosure of which is hereby incorporated by reference. A copy of RFC 1180 is currently available at ftp.isi.edu/in notes/rfc1180.txt.

SUMMARY OF THE INVENTION

In accordance with the present invention, operation of an e-mail system is modified to incorporate a flow control filter (service). During processing of incoming e-mail, each child MTA process (that is created to handle a particular new connection) connects to the flow control filter service, so that it can interact with the service during arrival of a message. This interaction provides a complete description of the incoming client, including IP address and host name, as well as the complete SMTP interaction, including HELO (i.e., initial "hello" handshake), MAIL FROM (i.e., sender information), RCPT TO (i.e., recipient list), and DATA (i.e., entire message body). Since the flow control filter service monitors all children processes, it attains a global view of traffic flowing through the system. By virtue of its global view, the flow control filter service can track information on a per domain basis, including total volume of e-mail received from a particular domain over a given period of time. Examples of other metrics that may be tracked include total connections and total senders (count) encountered for a particular domain over a given period of time. Other examples include total number of different recipients, total number of envelopes, and total aggregate volume of mail. Since the knowledge lost by the forking process is captured by the flow control filter service, the service is in a position to enforce policy-based rules, including placing restrictions on child processes, based on the per-domain tallies encountered.

The overall methodology of operation may be summarized as follows. The following method steps occur in the context of an incoming message that is being processed by the e-mail system (i.e., MTA forking has already occurred) and now the system is ready to evoke the services of the flow control filter of the present invention. Invocation of the flow control filter begins with the MTA (i.e., a child MTA of the original (parent) listener) connecting to the flow control filter (e.g., using Sendmail Milter protocol); the filter accepts the connection. The MTA and the filter perform a handshake sequence, including feature and parameter negotiation. At the conclusion of the handshake sequence, a new thread is created (i.e., in the flow control engine) for processing the new connection/message. Now, the MTA passes to the filter the corresponding connection information (e.g., IP address and host name) of the sending MTA. Based on the connection information, the filter may look up matching class data from the configuration file. In the event that no matching class data is found, the filter will assume unrestricted access for the host and therefore will accept the connection and message. In that case, the flow control engine thread handling the connection may terminate, as there is no further filtering work to be done for this incoming connection and message; the MTA proceeds normally with no further interaction with the filter. Otherwise, the method proceeds to the following filtering steps. The method tests whether class limits have been reached. In the event that limits have not been reached (i.e., true), the filter instructs the MTA to continue and increments the current connection count. Otherwise (i.e., false), the method terminates with the filter rejecting the connection and returning an administrator-defined error code. In the event that the process did not terminate, the MTA reports the sender information to the filter; this occurs in response to the MAIL FROM SMTP phase.

The method notes the sender (i.e., who is the sender) in the class. The administrator-defined class may include, for example, a sender-based parameter indicating that the filter should note the number of unique senders that have arrived in a given timeframe for this particular host (of the class). In a manner similar to above, the method tests whether class' sender limits have been reached. In the event that limits have not been reached (i.e., true), the filter instructs the MTA to continue and increments the current unique sender totals. Otherwise, the method terminates with the filter rejecting the message (returning any administrator-defined error code). In the event that the filtering process has not terminated based on sender information, the method proceeds to test recipient (RCPT TO) information. The configuration file allows the administrator to define a class that limits the number of unique recipients received for that class, over any given time span. As a given message may have multiple recipients, the step repeats for each recipient (information) of the message. As before, if specified limits are exceeded, the method terminates with the filter rejecting the message (returning any administrator-defined error code). Otherwise, the method updates the totals and proceeds.

The MTA reports the message body, which may be transmitted as one or more blocks. The method updates a running total of message size. This information is used to determine the aggregate total of bytes received from a given source over a period of time. The MTA reports end of message for the current incoming message. The method compares the message size against class limits specified in the configuration file. Again as before, if specified limits are exceeded, the method terminates with the filter rejecting the message (returning any administrator-defined error code). Otherwise, the incoming message has passed all filters and is accepted. Now, the method may repeat for other incoming messages.

This approach may be easily scaled, for application on a site-wide basis. In that instance, the flow control filter service monitors the children processes for a number of e-mail servers at a given site. In such a configuration, the flow control filter service would apply policy on a global (site) basis, instead of on a per server basis.

DETAILED DESCRIPTION OF A PREFERRED EMBODIMENT

The following description will focus on the presently-preferred embodiment of the present invention, which is implemented in server-based software operating in an Internet-connected environment running under a server operating system, such as the Microsoft® Windows NT running on an IBM-compatible server computer. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic System Hardware (e.g., for Desktop and Server Computers)

Figure 1A:
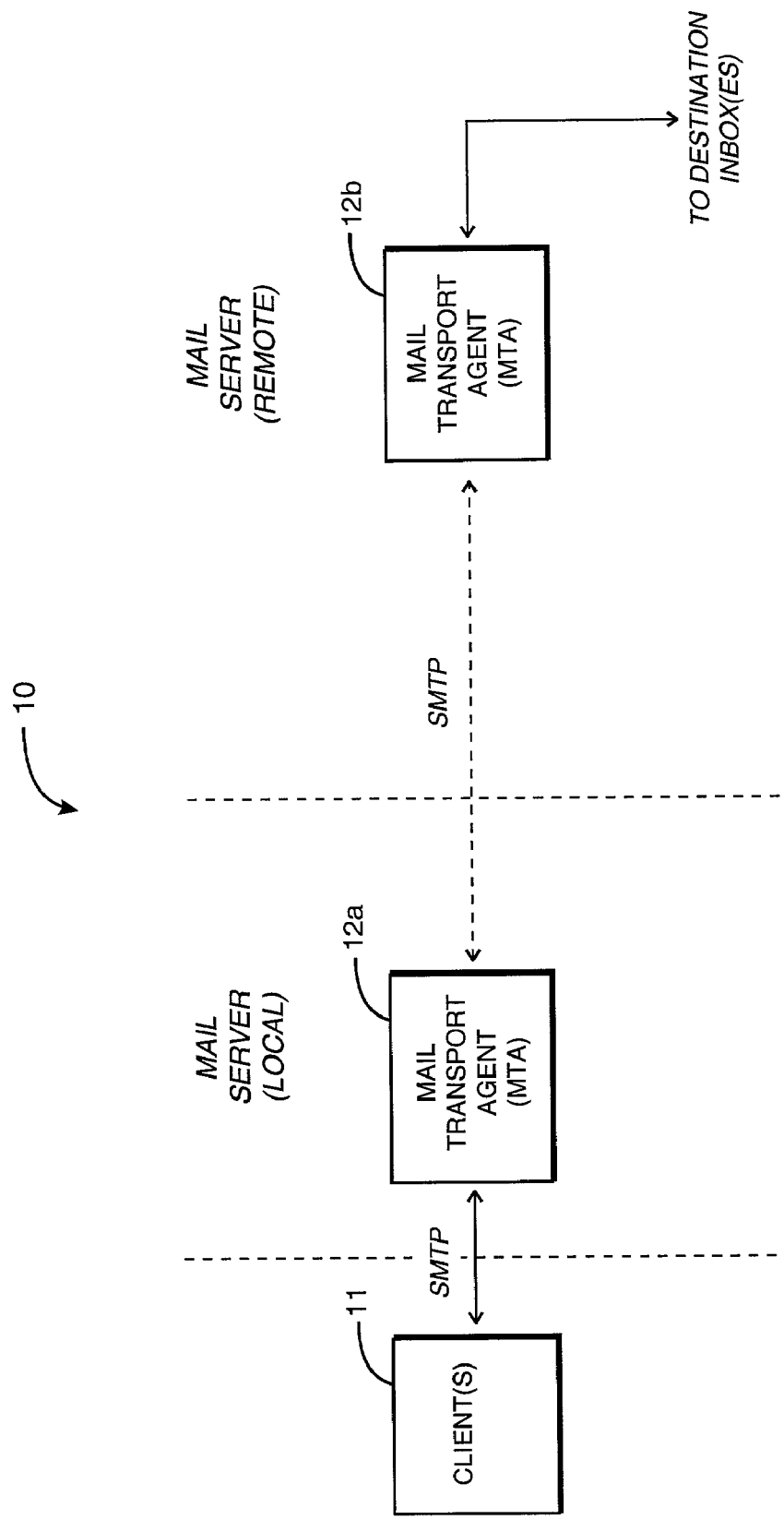
FIG. 1A illustrates the basic architecture of a typical electronic mail system.
Figure 1B:
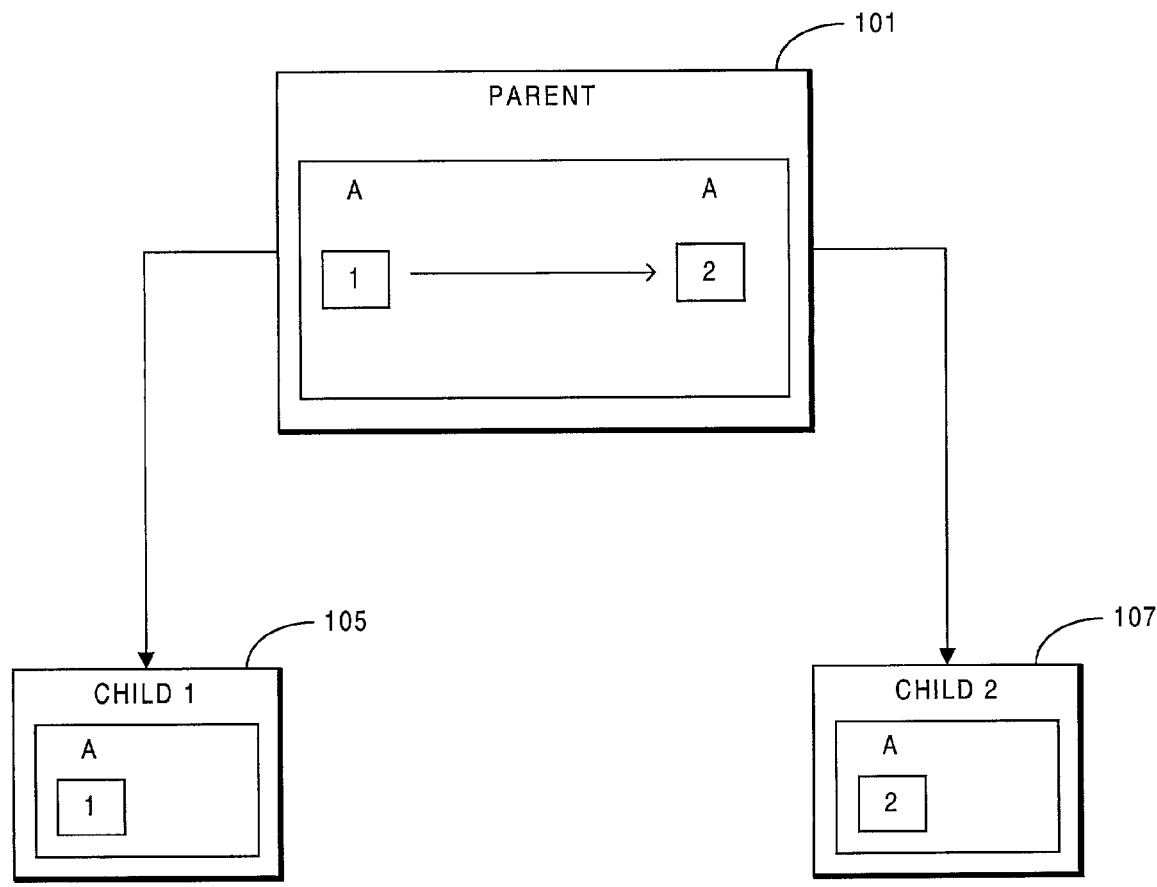
FIG. 1B illustrates the problem encountered with present-day use of forking operations to create child MTA processes.
Figure 2:
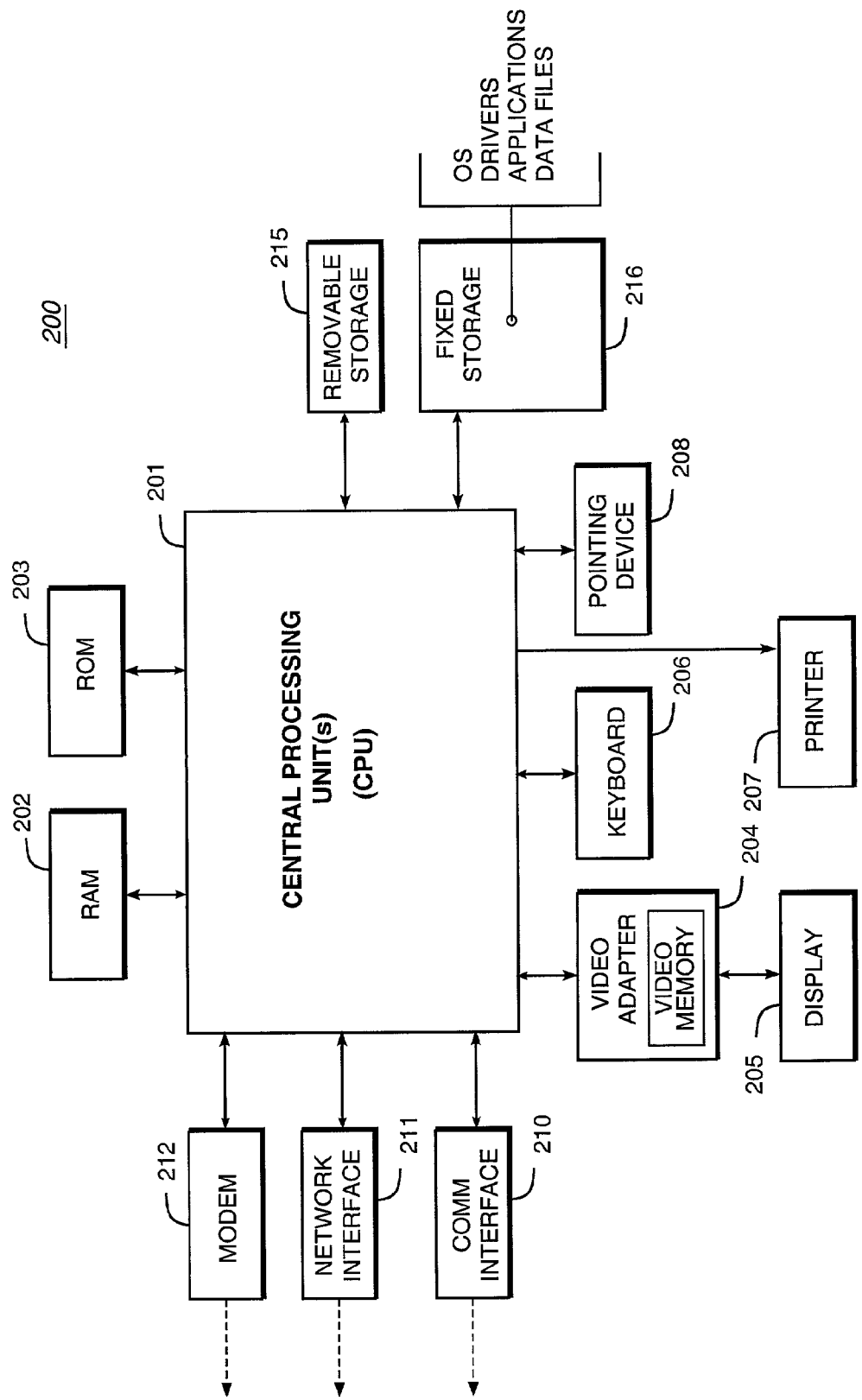
FIG. 2 is a block diagram of a general-purpose computer system (e.g., IBM-compatible PC or server computer) in which computer-implemented methods of the present invention may be embodied.

The present invention may be implemented on a conventional or general-purpose computer system, such as an IBM-compatible server computer operating under a server operating system. FIG. 2 is a very general block diagram of an IBM-compatible system 200. As shown, system 200 comprises a central processing unit(s) (CPU) 201 coupled to a random-access memory (RAM) 202, a read-only memory (ROM) 203, a keyboard 206, a printer 207, a pointing device 208, a display or video adapter 204 connected to a display device 205, a removable (mass) storage device 215 (e.g., floppy disk), a fixed (mass) storage device 216 (e.g., hard disk), a communication port(s) or interface(s) 210, a modem 212, and a network interface card (NIC) or controller 211 (e.g., Ethernet). Although not shown separately, a real-time system clock is included with the system 200, in a conventional manner.

CPU 201 comprises a processor of the Intel Pentium® family of microprocessors. However, any other suitable microprocessor or microcomputer may be utilized for implementing the present invention. The CPU 201 communicates with other components of the system via a bi-directional system bus (including any necessary input and output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 202 serves as the working memory for the CPU 201. In a typical configuration, RAM of sixteen megabytes or more is employed. More or less memory may be used without departing from the scope of the present invention. The read-only memory (ROM) 203 contains the basic input output system code (BIOS)—a set of low-level routines in the ROM that application programs and the operating systems can use to interact with the hardware, including reading characters from the keyboard, outputting characters to printers, and so forth.

Mass storage devices 215 and 216 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the removable storage device 215 or fixed storage 216 into the main (RAM) memory 202, for execution by the CPU 201. During operation of the program logic, the system 200 accepts user input from a keyboard 206 and pointing device 208, as well as speech-based input from a voice recognition system (not shown). The keyboard 206 permits selection of application programs, entry of keyboard-based input or data, and selection and manipulation of individual data objects displayed on the display screen 205. Likewise, the pointing device 208, such as a mouse, track ball, pen device, or the like, permits selection and manipulation of objects on the display screen. In this manner, these input devices support manual user input for any process running on the system.

The computer system displays text and/or graphic images and other data on the display device 205. The video adapter 204, which is interposed between the display 205 and the CPU 201, drives the display device 205. The video adapter 204, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 211 connected to a network (e.g., Ethernet network), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication ("comm") interface 210, which may include a RS-232 serial port, a Universal Serial Bus (USB) interface, or the like. Other devices may be connected locally via the comm interface 210.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Sun Solaris workstations, which are available from Sun Microsystems of Mountain View, Calif.

The above-described system 200 of FIG. 2 is presented for purposes of illustrating the basic hardware underlying desktop (e.g., e-mail client) and server computer (e.g., SMTP server) components that may be employed in the system of the present invention. Those skilled in the art will appreciate that the present invention may be implemented in any type of computer system or processing environment capable of supporting the methodologies of the present invention presented in detail below.

B. Basic System Software

Figure 3:
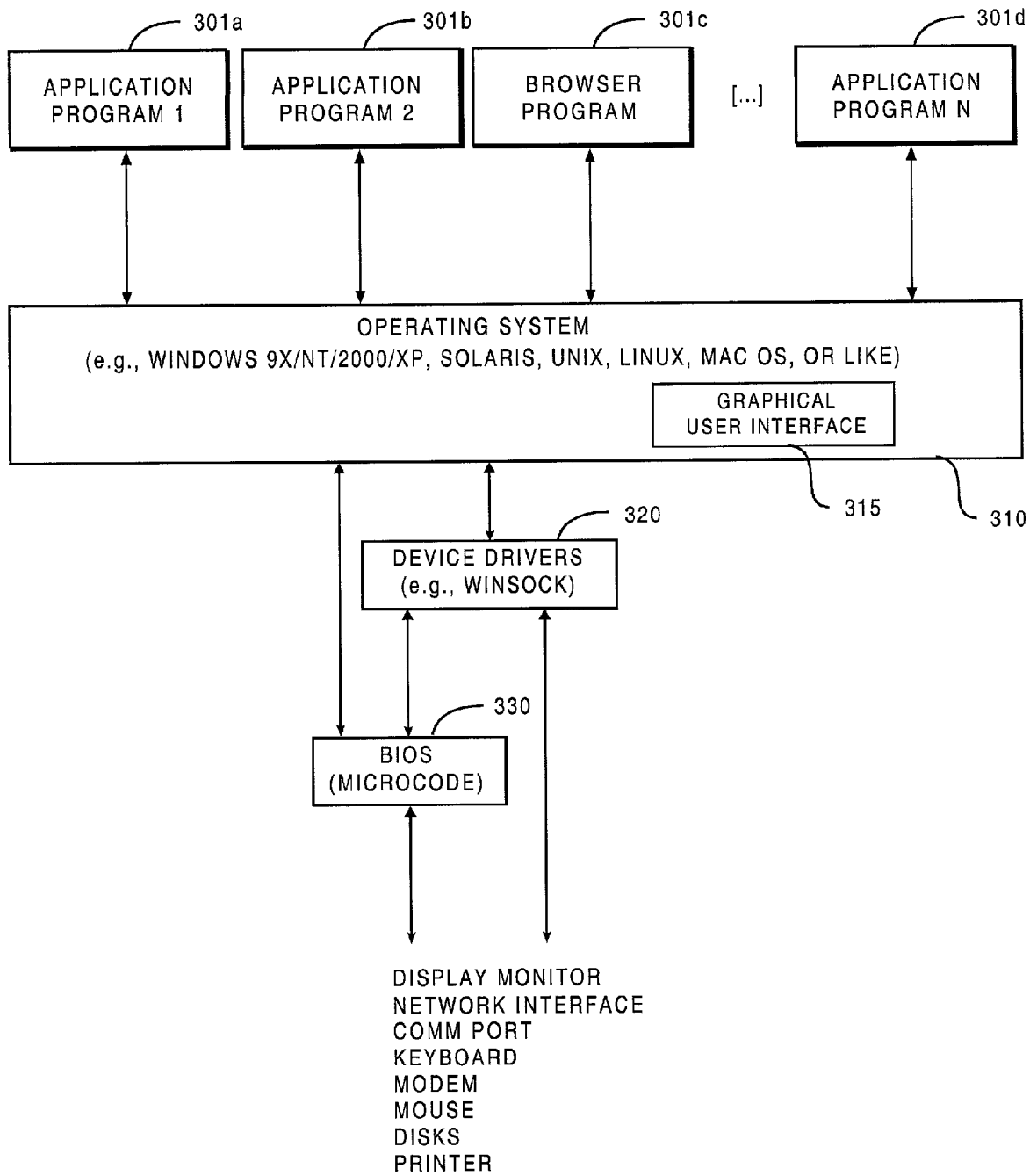
FIG. 3 is a block diagram of a computer software system for directing the operation of the computer system of FIG. 2.

Illustrated in FIG. 3, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301a, 301b, 301c, 301d) may be "loaded" (i.e., transferred from fixed storage 216 into memory 202) for execution by the software system 200. For instance, when the system 200 is employed to control a desktop machine, application software 301 includes client e-mail software 305 (e.g., Microsoft Outlook, available from Microsoft Corporation of Redmond, WA), as shown. When the system 200 is employed to control a server machine, on the other hand, application software 301 includes mail server software (e.g., Sendmail® for NT).

System 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver) and the system BIOS microcode 330 (i.e., ROM-based microcode), particularly when interfacing with peripheral devices. OS 310 can be provided by a conventional operating system, such as Microsoft® Windows 9x, by Microsoft® Windows NT, by Microsoft® Windows 2000, or by Microsoft® WindowsXP, all available from Microsoft Corporation of Redmond, Wash. Alternatively, OS 310 can also be an alternative operating system, such as IBM OS/2 (available from IBM of Armonk, N.Y.) or Linux OS (available from several vendors, including the Red Hat distribution of Linux from Red Hat, Inc. of Durham, N.C.).

The above-described computer hardware and software are presented for purposes of illustrating the basic underlying desktop and server computer components that may be employed for implementing the present invention. For purposes of discussion, the following description will present examples in which it will be assumed that there exists an MTA (e.g., "sendmail"—the Sendmail MTA) that communicates with one or more other MTAs (e.g., remote MTAs), as well as other relevant systems (e.g., a flow control filter of the present invention, described below). The present invention, however, is not limited to any particular environment or hardware configuration. In particular, an MTA distinction is not necessary to the invention, but is used to provide a framework for discussion. Instead, the present invention may be implemented in any type of system architecture or processing environment capable of supporting the methodologies of the present invention presented in detail below.

II. Filtering on a Per-domain Basis

A. Introduction

1. Basic SMTP

Most e-mail systems that send mail over the Internet use SMTP to send messages from one server to another. SMTP transports a mail object, which contains an envelope and content. The SMTP envelope is sent as a series of SMTP protocol units or commands. It includes an originator address (to which error reports should be directed), one or more recipient addresses, and optional protocol extension material. The SMTP content is sent in the SMTP DATA protocol unit and has two parts: the headers and the body. If the content conforms to other contemporary standards, the headers form a collection of field/value pairs structured as in the message format specification; the body, if structured, is defined according to MIME. The SMTP design is based on the following model of communication. In response to a user mail request, a sender-SMTP establishes a two-way transmission channel to a receiver-SMTP. The receiver-SMTP may be either the ultimate destination or an intermediate. SMTP commands are generated by the sender-SMTP and sent to a receiver-SMTP. SMTP replies are sent from the receiver-SMTP to the sender-SMTP in response to the commands. Once the transmission channel is established, the SMTP-sender sends a MAIL FROM command indicating the sender of the mail. If the SMTP-receiver can accept mail, it responds with an OK reply. The SMTP-sender then sends a RCPT TO command identifying a recipient of the mail. If the SMTP-receiver can accept mail for that recipient, it responds with an OK reply; if not, it responds with a reply rejecting that recipient (but not the whole mail transaction). The SMTP-sender and SMTP-receiver may negotiate several recipients. When the recipients have been negotiated, the SMTP-sender sends the mail data (DATA command), terminating with a special sequence. If the SMTP-receiver successfully processes the mail data it responds with an OK reply. Further description of SMTP may be found in RFC 821 (and subsequent RFC 2821), the disclosure of which is hereby incorporated by reference.

2. Sendmail Milter Interface

The present invention is implemented as a server-side flow control filter service that interacts with a mail server during arrival of an incoming message. This interaction may be achieved through use of Sendmail "Milter" interface. The Sendmail Mail Filter API (Milter) provides an interface for third-party software to validate and modify messages as they pass through the mail transport system. Filters can process messages' connection (IP) information, envelope protocol elements, message headers, and/or message body contents, and modify a message's recipients, headers, and body. Using Sendmail's corresponding configuration file, one can specify which filters are to be applied, and in what order, allowing an administrator to combine multiple independently-developed filters. Thus in this manner, the Milter plug-in architecture allows a developer to, in effect, plug into the e-mail delivery system for inserting custom subroutines or other processing. Accordingly, in the preferred embodiment, the flow control filter employs the Sendmail Milter interface for accessing internal phases and data of SMTP processing, and blocking or permitting message processing. For further description of Sendmail's Milter, see, e.g., "Filtering Mail with Sendmail" available from Sendmail, Inc. (and currently available via the Internet at www. sendmail.com/de/partner/resources/development/milter_api/), the disclosure of which is hereby incorporated by reference.

B. Overview of Per-domain Filtering

As described above, with each new connection a child MTA process is created. In accordance with the present invention, each child process connects to the flow control filter service, so that it can interact with the service during arrival of a message. This interaction provides a complete description of the incoming client, including IP address and host name, as well as the complete SMTP interaction, including HELO (i.e., initial "hello" handshake), MAIL FROM (i.e., sender information), RCPT TO (i.e., recipient list), and DATA (i.e., entire message body). Since the flow control filter service monitors all children processes, it attains a global view of traffic flowing through the system. By virtue of its global view, the flow control filter service can track information on a per domain basis, including total volume of e-mail received from a particular domain over a given period of time. Examples of other metrics that may be tracked include total connections and total senders (count) encountered for a particular domain over a given period of time. Other examples include total number of different recipients, total number of envelopes, and total aggregate volume of mail encountered for a particular domain over a given period of time. Since the knowledge lost by the forking process is captured by the flow control filter service, the service is in a position to enforce policy-based rules, including placing restrictions on child processes, based on the per-domain tallies encountered.

This approach may be easily scaled, for application on a site-wide basis. In that instance, the flow control filter service monitors the children processes for a number of e-mail servers at a given site. In such a configuration, the flow control filter service would apply policy on a global (site) basis, instead of on a per server basis.

C. Architecture Modification to Provide Per-Domain Filtering

Figure 4:
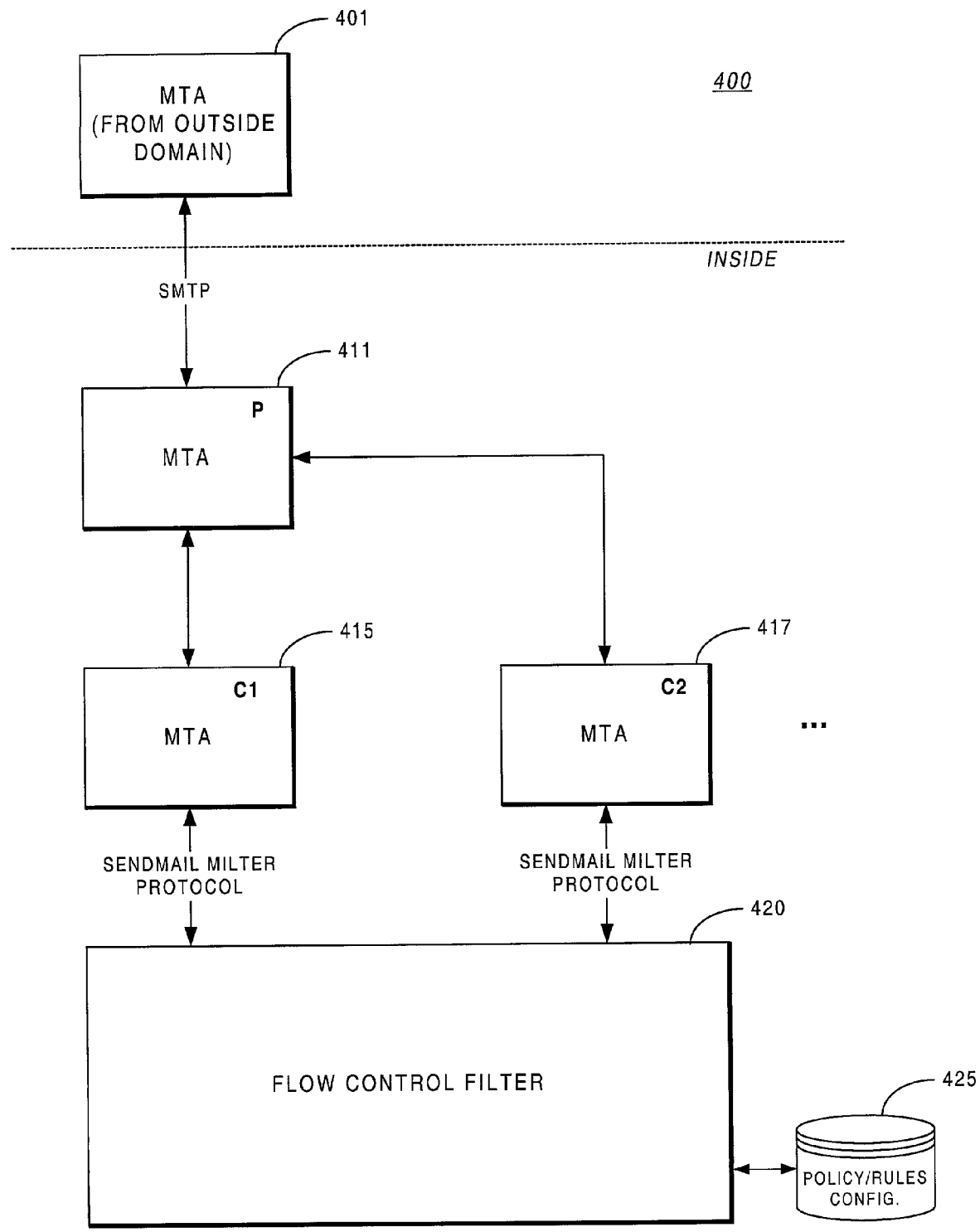
FIG. 4 is a high-level block diagram illustrating an e-mail environment that includes a flow control filter of the present invention.

FIG. 4 is a high-level block diagram illustrating an e-mail environment 400 that includes a flow control filter 420 of the present invention. At the highest level, an outside Mail Transport Agent (MTA) 401 (e.g., an MTA residing somewhere on the Internet) establishes a connection with an internal MTA 411 (e.g., a company's internal MTA) to communicate a new e-mail message. This communication will occur via the SMTP protocol. Upon receipt of the incoming connection request, the MTA 411 (denoted as the Parent MTA, P) creates a first child MTA process 415 (denoted as C1). The task of processing the incoming connection is, in effect, handed off to the child MTA process (C1) 415. Further, the child MTA process (C1) 415 makes an additional connection to the flow control filter (service) 420, which has previously registered (to be alerted) through the Sendmail Milter interface. The child process reports to the flow control filter the exact nature of the incoming connection and accompanying e-mail message. This process continues for other incoming connections. For example, as shown, the second MTA process (C2) 417 has been created to handle yet another incoming connection. As was the case with the first MTA process (C1) 415, the second MTA process (C2) 417 connects to the flow control filter 420. The process may continue for any arbitrary number of incoming connections, as may be supported by a given embodiment (e.g., up to hardware resource limits).

The reporting to the flow control filter 420 occurs at every stage of the connection. At the beginning of its connection, for example, the child MTA (C1) 415 sends a message to the flow control filter 420 indicating that an incoming connection has been requested from a particular domain. In response to this message, the flow control filter 420 approves or disapproves the connection request, based on what has transpired already (e.g., number of connections from this domain) and the policy/rules 425 currently in force. Similarly, at each stage of the SMTP dialog (between the outside MTA 401 and the child MTA (C1) 415), the child MTA (C1) 415 posts a message to the flow control filter 420 for indicating the exact contents of the SMTP dialog. Again, the flow control filter 420 approves or disapproves each phase of the SMTP dialog exchange (e.g., "proceed" or "do not proceed"), based on what has transpired already and the policy/rules 425 currently in force. In this manner, policy can also be applied based on the specific data which comprises a given e-mail message.

When the final interaction between a given child MTA (e.g., 415 or 417) and the flow control filter 420 has completed, the flow control filter 420 issues a final disposition indicating whether the current incoming e-mail message should be accepted or rejected. Thereafter, the connection between the child MTA and the flow control filter 420 may be terminated. If the incoming connection is delivering several messages, the connection between a corresponding child MTA and the flow control filter 420 will persist, so that it may be reused until the child MTA terminates the connection (at the conclusion of its operation, or in response to instructions from the flow control filter 420).

D. Flow Control Filter Architecture and Basic Operation

Figure 5:
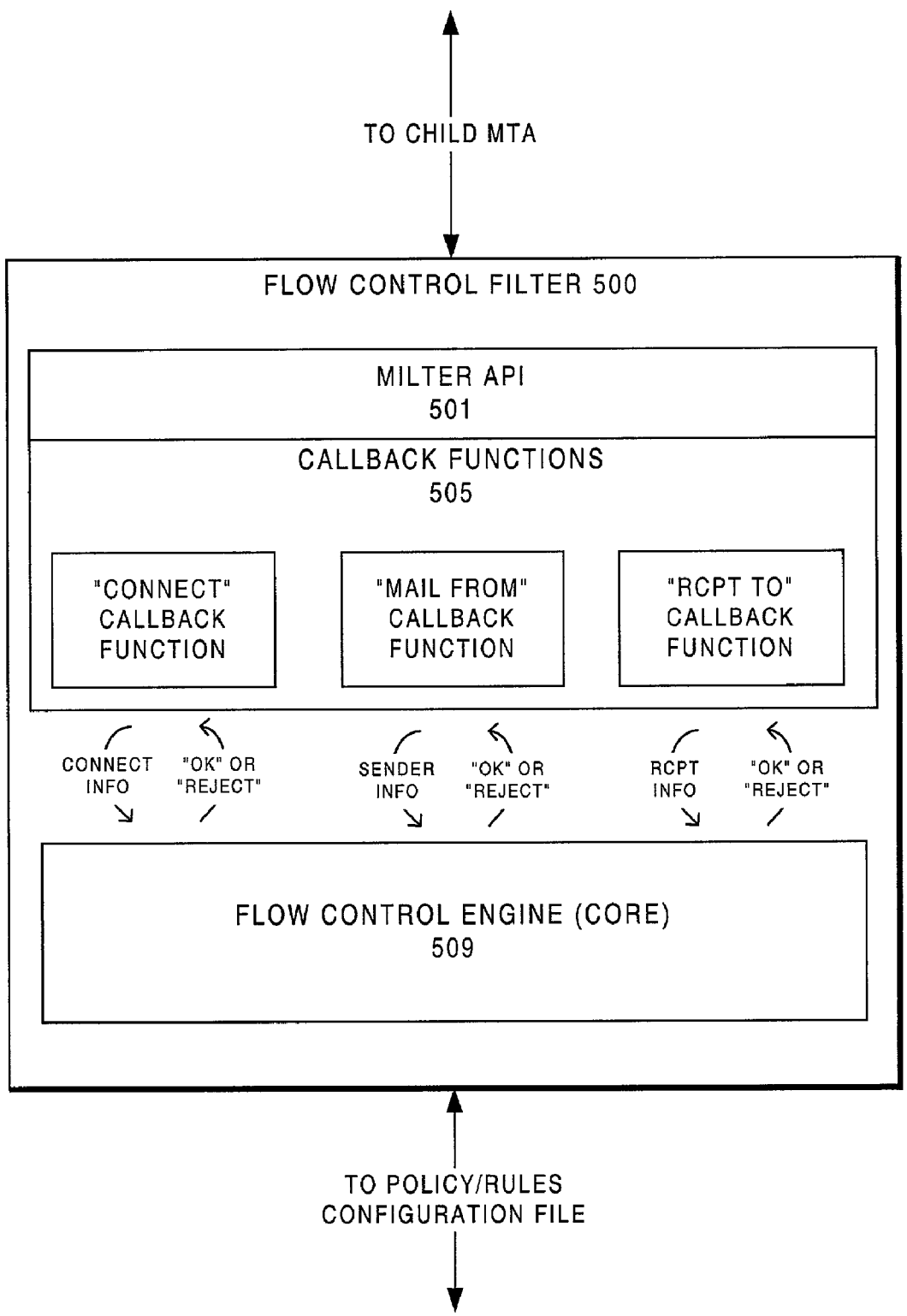
FIG. 5 is a block diagram illustrating the flow control filter of the present invention in further detail.
Figure 6A:
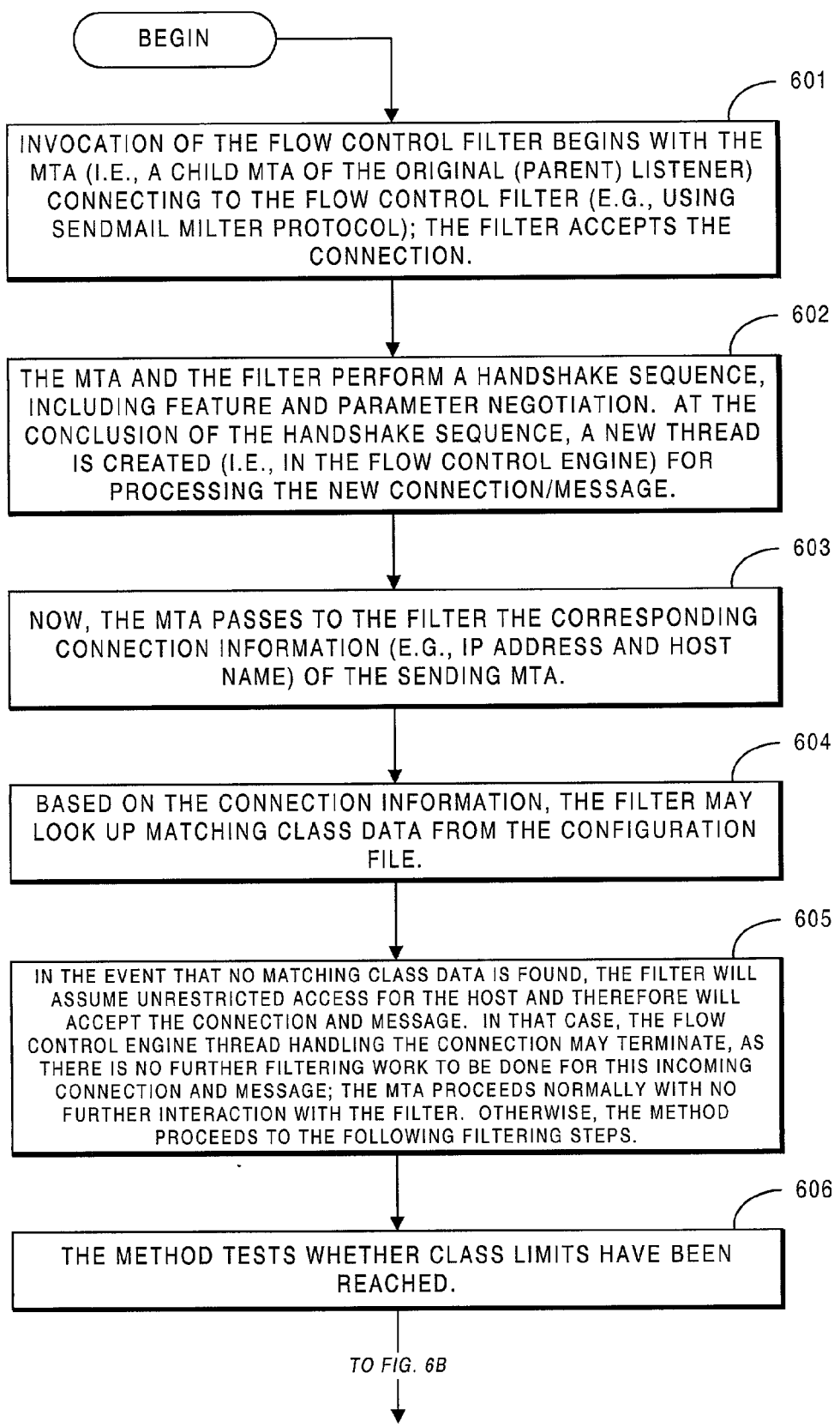
FIGS. 6A–D comprise a sequence of method steps providing a summary of a flow control filtering methodology of the present invention.
Figure 6B:
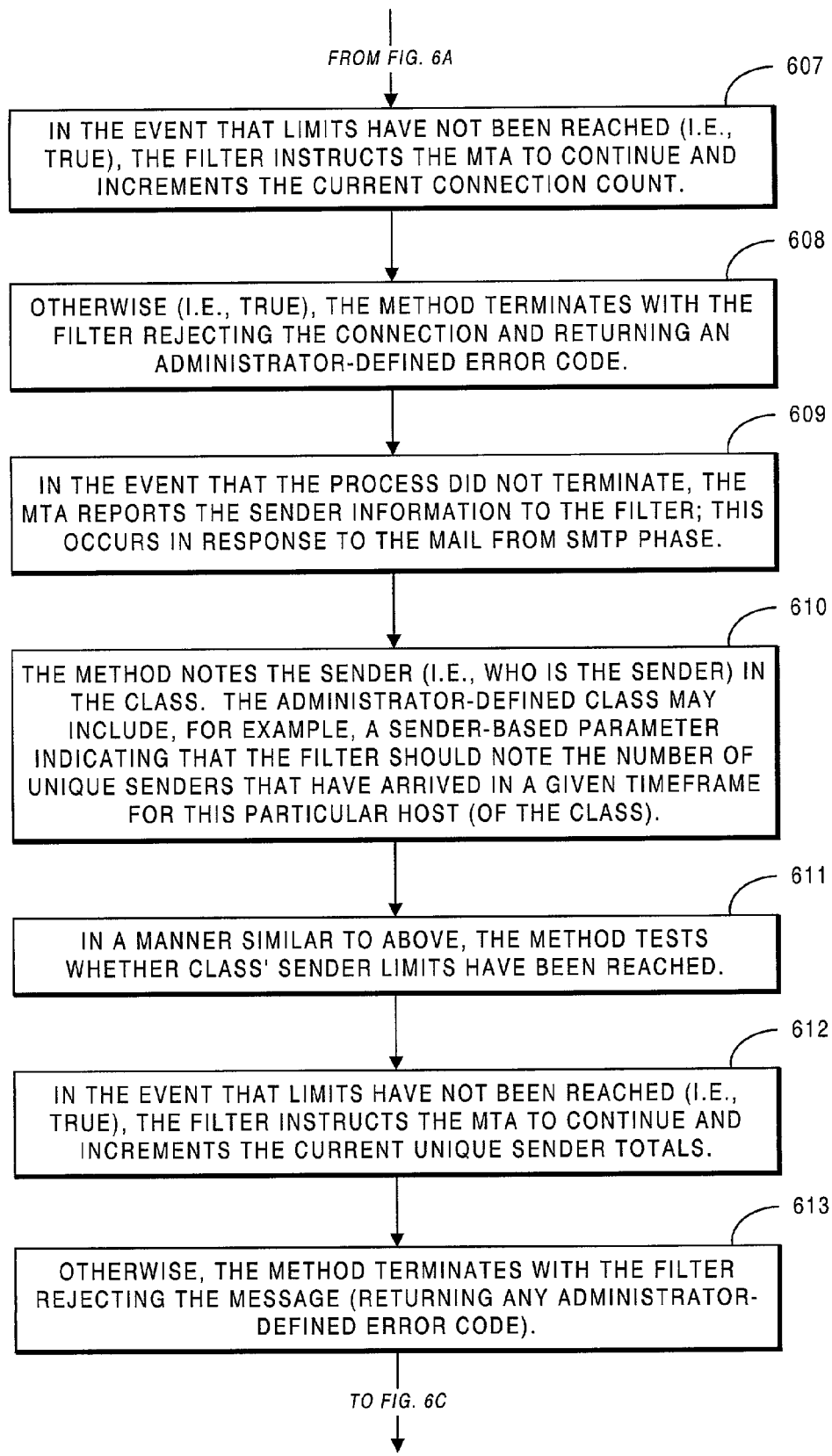
Figure 6C:
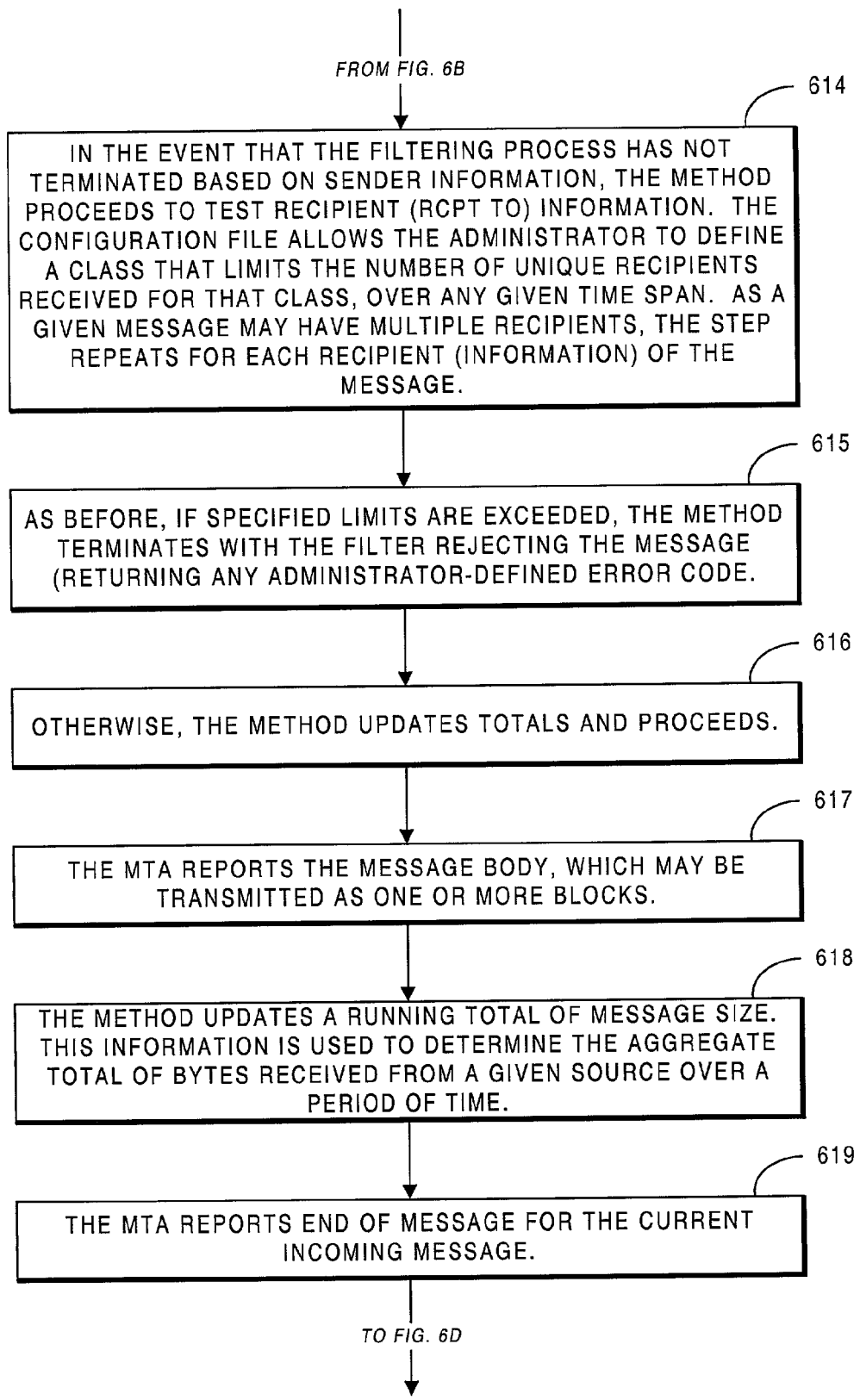
Figure 6D:
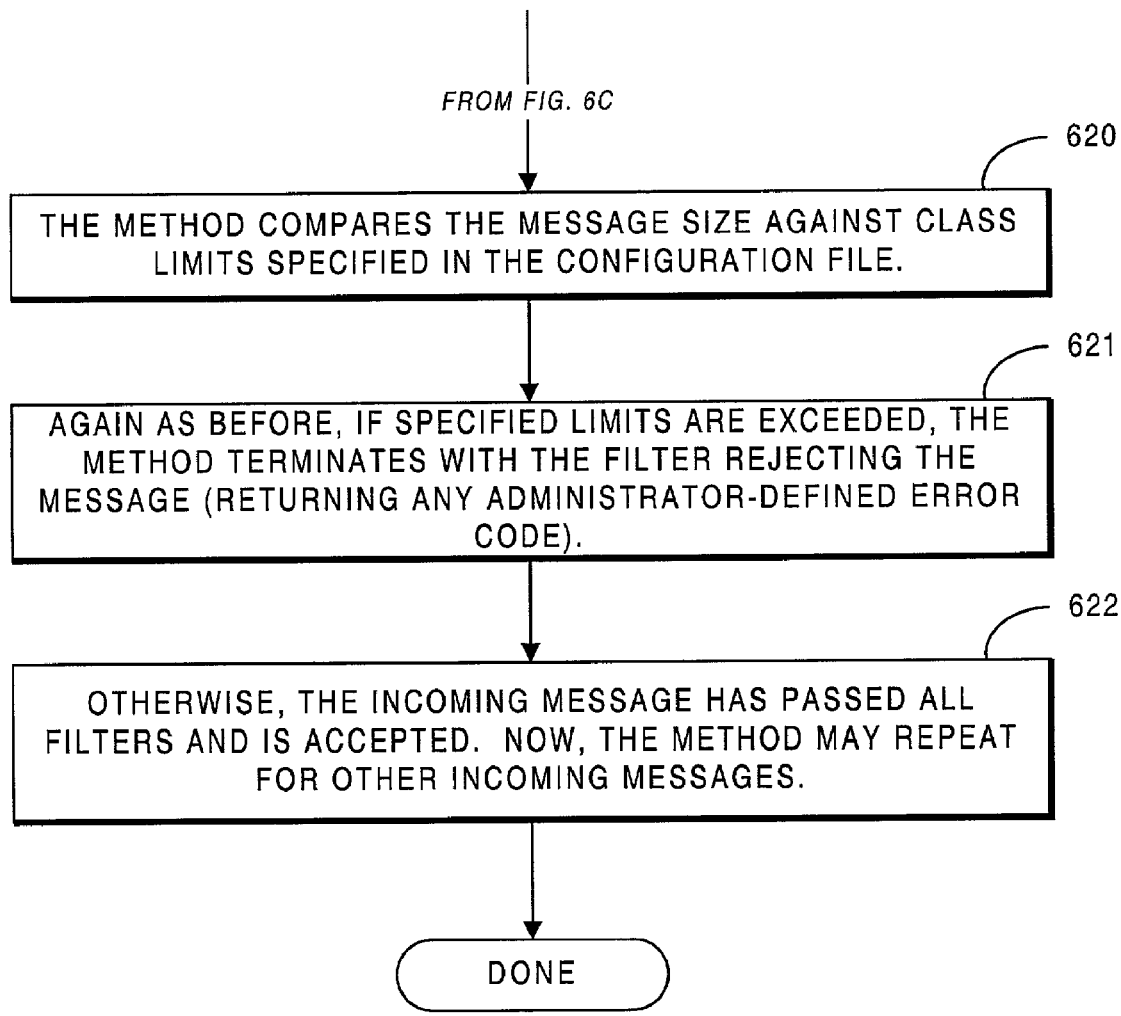

FIG. 5 is a block diagram illustrating the flow control filter of the present invention in further detail. As shown, flow control filter 500 includes a Milter API (application programming interface) module 501, callback functions 505, and a flow control engine (core) 509. The Milter API 501 provides an interface between the flow control filter 500 and child MTAs, so that each child MTA may connect with the flow control filter 500. In operation, the Milter API 501 registers callback functions 505 with the corresponding Sendmail Milter service. The callback functions 505 correspond to various phases of the SMTP dialog including, for example, a "connect" callback function, a "MAIL FROM" callback function, and a "RCPT TO" (i.e., recipient) callback function. In this manner, the flow control filter 500 may register its own custom handlers (i.e., callback functions 505) with the Sendmail Milter service, and do so in a manner that allows the flow control filter 500 to retain session-specific information (e.g., stored by the callback functions in thread-specific memory). For example, the "connect" callback function will store connection information (e.g., connection handle) for the current session.

By maintaining session-specific information, the flow control filter 500 can track information characterizing system operation. For instance, the flow control filter 500 can log timestamp information pertaining to the occurrence of a particular event of interest, as well as maintaining running totals indicating how often that event has occurred. By comparing this information against configurable policy rules (e.g., maximum number of times that a particular event is allowed to occur in a given time period), the flow control filter 500 may selectively block particular events (e.g., until a configurable timer has elapsed). Thus, the tracking of information allows the flow control filter 500 to moderate traffic flow through one's e-mail system.

Basic operation occurs as follows. When a new connection request arrives, the flow control filter 500 creates a new connection thread (e.g., "Thread #1") within the flow control engine 509. The connect callback function stores relevant connection information ("connect info") in thread-specific memory (e.g., memory for Thread #1). At the level of the flow control engine 509, the incoming information for the current SMTP phase—here, connection information—is compared against configurable policy rules. If no rules are violated by permitting the connection, then the flow control engine 509 (Thread #1) returns an acknowledgment of "OK", whereupon processing may continue to the next SMTP phase. Otherwise, the flow control engine 509 returns a "Reject" result, whereupon the incoming connection is rejected.

If a "Reject" result did not occur, processing of subsequent SMTP phases continues in this manner, with the other corresponding callback functions contacting the flow control engine 509 about specific SMTP-phase information. Therefore, after the connection is approved, processing of the SMTP "MAIL FROM" phase ensues, using the "MAIL FROM" callback function. Here, the "MAIL FROM" callback function contacts the flow control engine 509 with sender information. In the same manner as before, the flow control engine 509 either accepts or rejects the information, based on application of policy rules to the sender information. Finally, the "RCPT TO" callback function posts the recipient information to the flow control engine 509. Again, this information is either accepted or rejected by the flow control engine 509. In any instance where a rejection occurs, subsequent SMTP phases for the incoming message are blocked. The system may be configured to return a specific error code and/or a message (e.g., "AOL.com has exceeded its totals for the hour"). If no rejection has occurred, on the other hand, the incoming message will be successfully processed.

E. Policy Rules

1. Classes of Hosts

As described above, the flow control filter references a policy/rules configuration file, for determining how a particular event is processed. In the currently preferred embodiment, the configuration file describes administrator-defined classes of hosts, with each class being defined by domain. The classes may be assigned arbitrary administrator-supplied class names. During the "connect" SMTP phase for a given message, the flow control filter attempts to classify the host (domain) for an incoming message into one of the administrator-defined host classes.

Each class may be defined to include events to monitor. Each event monitored is associated with three class members: current running total, maximum, and timeframe (to monitor). Additionally, the class tracks a timestamp indicating when monitoring commenced. During run time, these members may be in an in-memory table upon loading of the configuration file, and maintained on an ongoing basis by corresponding threads (from the flow control engine) during message processing. Thus, during message processing, threads from the flow control engine update totals, as appropriate. When a limit is exceeded (e.g., in a given time period), a corresponding administrator-defined error message is returned and further traffic from that host is blocked (until resetting of the time period). The system administrator may configure how firmly the system should reject the message: either the message is blocked as a temporary failure (which invites the sending MTA to resend later), or it is blocked as a permanent failure (which typically generates a "bounce" message).

The configuration file supports an "aggregation" option. When aggregation is enabled for a class, the class data structure applies to all hosts (e.g., all AOL.com hosts). For example, if A.AOL.com and B.AOL.com both connect to the system, then the running totals for both are applied to the corresponding class data structure. If aggregation is not enabled, the system will create separate instances of each class. Each instance will have an identical copy of the specified limits, however, the running totals for each are maintained separately.

2. Policy Configuration

The configuration file is a text file whose contents follow the well-known Apache configuration file format. A Class configuration block defines a set of limits for clients that fit in that class. Within each block, the limits are defined, as well as patterns that are matched against incoming connections. Each client connection is associated with the first class whose definition matches it. That client's inbound SMTP traffic is then subject to the limitations defined by that class.

A Class is defined with the following syntax:

<Class classname>

. . .

</Class>

Any number of classes can be defined. A classname is a name unique among Class definitions and consists of any combination of ASCII letters, numbers, digits or punctuation. A Class definition includes the matching specifications and the limit specifications for that class. In the currently preferred embodiment, the supported settings and their permitted values are as follows:

| Parameter | Value Format | Description |
| --- | --- | --- |
| Host | hostname.<br>domain<br>ip-addr<br>ip-block/mask* | Specifies which hosts fall within this class. A specific hostname must match exactly (matching is case-insensitive). A domain must match the hostname by being a right-justified substring match in the hostname (matching is case-insensitive). The IP address must match exactly, or the IP address of the client must fall within the specified IP block. If "*" is present, all hosts match. Multiple Host entries may be present in any Class definition. |
| Aggregate | { True \| False } | If True, the running totals for this class apply across all hosts that fall within the class. If False each host within the class has individual limits as defined within this class. For example, if the class applies to all hosts in domain example.com and connections arrive from hosts a.example.com and b.example.com, then if this feature is set to False, each host is counted as having made one connection and the limits defined apply to each host individually; if this feature is set to True, the entire class is counted as having made two connections |

-continued

| Parameter | Value Format | Description |
|---|---|---|
| Cascade | { True \| False } | and the limits defined apply to the class-wide totals. The default is False. If this is True and an arriving connection or message would cause the class or host to exceed its limits, the filter will attempt to place the connection into the next available matching class whose limits have not yet been exceeded. If False, the message will fail as defined by the Response setting. The default is False. |
| Connections | lim / time | Specifies that no more than lim connections can arrive within the specified time. The time is assumed to be in seconds unless terminated by a letter such as d (days), h (hours), or m (minutes). These can also be combined (e.g. 1d6h for one day and six hours). |
| Envelopes | lim / time | Specifies that no more than lim distinct messages can arrive within the specified time. The time is as defined above. |
| Message | [ SMTP error : [ ESC : ]] message | Defines the error message to be returned whenever the selected Response is invoked. The message is required. It is also possible to specify a standard SMTP error code as per RFC821, and an Enhanced Status Code (ESC) as defined by RFC1893. If no message is specified, whatever the MTA's default response text message is will be used. |
| Recipients | lim / time | Specifies that no more than lim distinct recipients can be addressed within the specified time. The time is as defined above. |
| Response | { DISCARD \| REJECT \| TEMPFAIL } | Selects the action to be taken when one or more of the limits for the class is exceeded. DISCARD causes the server MTA to return a success message to the client MTA and silently drop the message; REJECT causes the server MTA to return a permanent (SMTP 5xx) error message to the client MTA; and TEMPFAIL causes the server MTA to return a temporary (SMTP 4xx) error message to the client MTA. The default is REJECT. |
| Senders | lim / time | Specifies that no more than lim distinct senders can be addressed within the specified time. The time is as defined above. |
| Volume | lim / time | Specifies that no more than lim bytes of message body can be sent within the specified time. The time is as defined above. The lim can be specified in larger units by ending the limit value with a k (for kilobytes), m (for megabytes) or g (for gigabytes). |

The order of the lines in the configuration file is significant. For example, if an incoming connection matches more than one class definition, the matching class definition that appears first in the file will be the one selected.

The absence of any of the limit lines in a class suggests that that criteria will not be used to limit the flow for that class. The absence of all of the limit lines in a class suggests that hosts in that class may send mail to the server MTA without bound. The configuration file is read when the filter is started, or upon a new connection if the configuration file has been updated since it was last read. Whenever the configuration file is reloaded, all current counts and timestamps used to maintain totals for each class are discarded. If an incoming connection applies to no classes defined in the file, the arriving message(s) are delivered normally.

3. Policy Configuration Example

The following configuration class definitions, which may be created in a text editor by a user, illustrates specification of policy rules.

```
<Class Sendmail>
  Host .sendmail.com
</Class>
<Class AOL>
  Host *.aol.com
  Recipients 1000/1d
</Class>
<Class Others>
  Aggregate True
  Host *
  Connections 250/1d
</Class>
```

As shown, the script defines three classes: Sendmail, AOL, and Others. In the case of Class AOL, for example, the host (domain matching *.aol.com) is defined to have a maximum number of different (i.e., unique) recipients per day (e.g., 1,000).

F. Summary of Overall Operation

FIGS. 6A–D provide a summary of the overall methodology 600 of the present invention. The following method steps occur in the context of an incoming message that is being processed by the e-mail system (i.e., MTA forking has already occurred) and now the system is ready to evoke the services of the flow control filter of the present invention. The method steps are as follows.

Invocation of the flow control filter begins with the MTA (i.e., a child MTA of the original (parent) listener) connecting to the flow control filter (e.g., using Sendmail Milter protocol), as shown at step 601; the filter accepts the connection. As shown at step 602, the MTA and the filter perform a handshake sequence, including feature and parameter negotiation. This allows the two to agree upon what version of the Sendmail Milter protocol is to be employed for communication. At the conclusion of the handshake sequence, a new thread is created (i.e., in the flow control engine) for processing the new connection/message. Now, the MTA passes to the filter the corresponding connection information (e.g., IP address and host name) of the sending MTA, as indicated at step 603. This information is passed to the previously described connection callback function, thus making the connection information available to the filter. Thus, based on the connection information, the filter may look up matching class data from the configuration file, as shown at step 604. In the event that no matching class data is found, tested at step 605, the filter will assume unrestricted access for the host and therefore will accept the connection and message. In that case, the flow control engine thread handling the connection may terminate, as there is no further filtering work to be done for this incoming connection and message; the MTA proceeds normally with no further interaction with the filter. Otherwise, the method proceeds to the following filtering steps.

At step 606, the method tests whether class limits have been reached. In the event that limits have not been reached (i.e., "true") at step 606, the filter instructs the MTA to continue and increments the current connection count, as indicated at step 607. Otherwise (i.e., "false"), the method terminates with the filter rejecting the connection and returning an administrator-defined error code, as indicated by step 608. In the event that the process did not terminate, at step 609, the MTA reports the sender information to the filter; this occurs in response to the "MAIL FROM" SMTP phase. At step 610, the method notes the sender (i.e., who is the sender) in the class. The administrator-defined class may include, for example, a sender-based parameter indicating that the filter should note the number of unique senders that have arrived in a given timeframe for this particular host (of the class). This is designed in particular to catch "spammer" addressers, as they tend to randomize sender addresses. As another example, a sender-based parameter may indicate other maximum limits, such as a maximum aggregate byte total or maximum message count acceptable from a given sender (e.g., over a specified time period). In a manner similar to above, the method tests whether class' sender limits have been reached, as indicated at step 611. In the event that limits have not been reached (i.e., "true") at step 611, the filter instructs the MTA to continue and increments the current unique sender totals, as indicated at step 612. Otherwise, the method terminates with the filter rejecting the message (returning any administrator-defined error code), as indicated by step 613.

In the event that the filtering process has not terminated based on sender information, the method proceeds to test recipient ("RCPT TO") information, at step 614. The configuration file allows the administrator to define a class that limits the number of unique recipients received for that class, over any given time span. As a given message may have multiple recipients, step 614 repeats for each recipient (information) of the message. As before, if specified limits are exceeded, the method terminates with the filter rejecting the message (returning any administrator-defined error code), as indicated by step 615. Otherwise, the method updates totals, at step 616, and proceeds.

At step 617, the MTA reports the message body, which may be transmitted as one or more blocks. At step 618, the method updates a running total of message size. This information is used to determine the aggregate total of bytes received from a given source over a period of time. At step 619, the MTA reports "end of message" for the current incoming message. Then, at step 620, the method compares the message size against class limits specified in the configuration file. Again as before, if specified limits are exceeded, the method terminates with the filter rejecting the message (returning any administrator-defined error code), as indicated by step 621. Otherwise, the incoming message has passed all filters and is accepted, as shown at step 622. Now, the method may repeat for other incoming messages. Throughout the operation of the method, class totals are updated. Once a given time period has elapsed for a class (i.e., current time exceeds the combination of the original "timestamp" plus "time limit"), totals for the class may be reset (e.g., to zero).

Appended herewith as Appendix A are source code listings (in the C/C++ programming language) providing further description of the present invention. A suitable C/C++ compiler/linker environment for compiling the source listings is available from a variety of vendors, including Microsoft Corporation of Redmond, Wash. and Borland Software Corporation (formerly, Inprise Corporation) of Scotts Valley, Calif.

While the invention is described in some detail with specific reference to a single-preferred embodiment and certain alternatives, there is no intent to limit the invention to that particular embodiment or those specific alternatives. All told, those skilled in the art will appreciate that modifications may be made to the preferred embodiment without departing from the teachings of the present invention.

APPENDIX A: SOURCE CODE LISTINGS

```
/*
** CLASS -- description of a class and its current state
**
** The class whose limits and totals are applied will be selected upon
** receipt of a MAIL FROM command. This does mean the applied
** class can change between envelopes within the same connection.
*/
typedef struct Class * Class;
struct Class
{
    bool       cls_aggr;        /* aggregate? */
    bool       cls_cascade;     /* cascade? */
    u_long     cls_conns;       /* connection count */
    u_long     cls_maxconns;    /* max. connection count */
    u_long     cls_envs;        /* envelope count */
    u_long     cls_maxenvs;     /* max. envelope count */
    u_long     cls_maxsenders;  /* max. sender count */
    u_long     cls_maxrcpts;    /* max. recipient count */
    size_t     cls_avol;        /* aggregate volume */
    size_t     cls_maxavol;     /* max. aggregate volume */
    time_t     cls_connstart;   /* conn. count start time */
    time_t     cls_conntlim;    /* conn. count time limit */
    time_t     cls_envstart;    /* envelope count start time */
    time_t     cls_envtlim;     /* envelope count time limit */
    time_t     cls_avolstart;   /* avol start time */
    time_t     cls_avoltlim;    /* avol time time limit */
    time_t     cls_sendertlim   /* sender list time limit */
    time_t     cls_rcpttlim;    /* recipient list time limit */
    char *     cls_message;     /* failure message to use */
    char *     cls_response;    /* failure disposition */
    Vector     cls_hostpat;     /* host patterns which apply */
    Vector     cls_senders;     /* vector of senders */
    Vector     cls_rcpts;       /* vector of recipients */
    smutex_t   cls_lock;        /* lock for this record */
};
/*
** MLFI_CONNECT -- handler for new connections
**
** Parameters:
**   ctx -- milter context
**   host -- hostname (possibly NULL?)
**   ip -- address, in in_addr form (possibly NULL?)
**
** Return value:
**   An SMFIS_* constant.
*/
sfsistat
mlfi_connect(ctx, host, ip)
    SMFICTX *ctx;
    char *host;
    _SOCK_ADDR *ip;
{
    Context pfc;
    time_t now;
    /* see if the config file was updated; if so, reload and reset */
    if (!pf_confcheck( ) )
        return SMFIS_TEMPFAIL;
    /* initialize a new context for this session */
    pfc = pf_initcontext( );
    if (pfc == NULL)
    {
        if (dolog)
        {
```

APPENDIX A: SOURCE CODE LISTINGS

```
                syslog(LOG_ERR, "unable to allocate new context: %m");
                return SMFIS_TEMPFAIL;
        }
    }
    /* store the client hostname and IP */
    if (host != NULL)
        pfc->ctx_clienthost = arena_strdup(pfc->ctx_arena, host);
    if (ip ?= NULL)
    {
        pfc->ctx_clientip = arena_malloc(pfc->ctx_arena,
                    sizeof (_SOCK_ADDR));
        memcpy(pfc->ctx_clientip, ip, sizeof(_SOCK_ADDR));
    }
    /* store it in thread-specific space */
    smfi_setpriv(ctx, pfc);
    /* select the class */
    pfc->ctx_class = pf_selectclass (pfc);
    if (pfc->ctx_class == NULL)
    {
        if (dolog)
            syslog(LOG_DEBUG, "%s: no classes match; accepting",
                pfc->ctx_msgid);
        pf_cleanup(ctx);
        return SMFIS_ACCEPT;
    }
    pfc->ctx_confread = TRUE;
    /* if we're over the limit, enact the class's disposition */
    if (pf_atlimit(pfc->ctx_class))
    {
        int ret;
        pf_failmsg(pfc->ctx_class, &ret);
        pf_cleanup(ctx);
        return ret;
    }
    /* lock the class */
    (void) smutex_lock(&pfc->ctx_class->cls_lock);
    /* increment class connection counter */
    (void) time(&now);
    if (now > pfc->ctx_class-> cls_connstart +
            pfc->ctx_class->cls_conntlim)
    {
        pfc->ctx_class->cls_conns = 0;
        pfc->ctx_class->cls_connstart = now;
    }
    pfc->ctx_class->cls_conns++;
    /* unlock the class */
    (void) smutex_unlock(&pfc->ctx_class->cls_lock);
    return SMFIS_CONTINUE;
}
/*
** MLFI_BODY -- handler for an arbitrary body block
**
** Parameters:
**  ctx -- milter context
**  bodyp -- body block
**  bodylen -- amount of data available at bodyp
**
** Return value:
**  An SMFIS_* constant.
*/
sfsistat
mlfi_body(ctx, bodyp, bodylen)
        SMFICTX *ctx;
        u_char *bodyp;
        size_t bodylen;
{
    Context pfc;
#ifndef DEBUG
    assert (ctx != NULL);
#endif /* !DEBUG */
    assert (bodyp != NULL);
    pfc = (Context) smfi_getpriv(ctx);
    assert(pfc != NULL);
    /* increment size count */
    pfc->ctx_msgsize += bodylen;
    return SMFIS_CONTINUE;
}
```

APPENDIX A: SOURCE CODE LISTINGS

```
/*
** MLFI_EOM -- handler called at the end of the message; we can now
**   decide based on the configuration what to do with this message,
**   update class information, and return the result
**
** Parameters:
**   ctx -- milter context
**
** Return value:
**   An SMFIS_* constant.
*/
sfsistat
mlfi_eom(ctx)
        SMFICTX *ctx;
{
    bool added;
    int c;
    int n;
    int ret;
    time_t now;
    char *hostname;
    ADDRESS a;
    Context pfc;
#ifndef DEBUG
    assert(ctx != NULL);
#endif /* !DEBUG */
    pfc = (Context) smfi_getpriv(ctx);
    assert(pfc != NULL);
    /* get hostname; used in the X header and in new MIME
    boundaries */
    hostname = smfi_getsymval (ctx, "j" );
    if (hostname == NULL)
        hostname = HOSTUNKNOWN;
    /* grab current time */
    (void) time(&now);
    /* lock the class */
    (void) smutex_lock(&pfc->ctx_class->cls_lock);
    /*
    ** Increment class counters, resetting any values which have
    ** expired.
    */
    /* envelope counter */
    if (now > pfc->ctx_class->cls_envstart +
            pfc->ctx_class->cls_envtlim)
    {
        pfc->ctx_class>cls_envs = 0;
        pfc->ctx_class->cls_envstart = now;
    }
    pfc->ctx_class->cls_envs++;
    /* volume counter */
    if (now > pfc->ctx_class->cls_avolstart +
            pfc>ctx_class->cls_avoltlim)
    {
        pfc->ctx_class->cls_avol = 0;
        pfc->ctx_class->cls_avolstart = now;
        pfc->ctx_class->cls_avol +=pfc>ctx_msgsize;
    /* sender counter */
    added = FALSE;
    for (c = 0; C < vector_length(pfc->ctx_class->cls_senders); c++)
    {
        /* get next record */
        a = vector_index(pfc->ctx_class->cls_senders, c);
        /* if it's the same sender, update the time and relocate */
        if (sm_strcasecmp(string_get_data(a->addr_addr),
                pfc->ctx_sender) == 0)
        {
            vector_remove(pfc->ctx_class->cls_senders, c);
            a->addr_when = now;
            vector_append(pfc->ctx_class->cls_senders, a);
            added = TRUE;
            break;
        }
        /* if not expired, stop looking */
        if (a->addr_when + pfc->ctx_class->cls_sendertlim >= now)
            break;
        /* expired; recycle the record */
        (void) vector_remove (pfc->ctx class->cls_senders, c);
```

APPENDIX A: SOURCE CODE LISTINGS -continued

```
    string_blank(a->addr_addr);
    string_printf(a->addr_addr, pfc->ctx_sender);
    a->addr_when =now;
    vectorappend(pfc->ctx class->cls_senders, a);
    added = TRUE;
/* couldn't recycle an old record, so make a new one */
if (*added)
{
    a = arena_zalloc(main_arena, sizeof(struct address));
    a>addr_addr =string_new(main_arena, pfc->ctx_sender);
    a>addr_when =now;
    vector_append(pfc->ctx class->cls_senders, a);
}
/* recipient counter */
for (n =0; n < vector_length(pfc->ctx_rcpts); n++)
{
    added = FALSE;
    for (c = 0; c < vector_length(pfc->ctx_class->cls_rcpts); c++)
    {
        /* get next record */
        a =vector_index(pfc->ctx_class->cls_rcpts, c);
        /* if it's the same recipient, update and relocate */
        if (sm_strcasecmp(string_get_data (a->addr_addr),
            vector_index(pfc->ctx rcpts, n)) == 0)
        {
            vector_remove(pfc->ctx class->cls_rcpts, c);
            a->addr_when = now;
            vector_append(pfc->ctx_class->cls_rcpts, a);
            added = TRUE;
            break;
        /* if not expired, stop looking */
        if (a->addr_when + pfc>ctx class->cls_sendertlim
            >= now)
        break;
        /* expired; recycle the record */
        (void) vector_remove(pfc->ctx class->cls_senders, c);
        string_blank(a->addr_addr);
        string_printf(a->addr_addr, pfc->ctx_sender);
        a->addr_when = now;
        vector_append(pfc->ctx_class->cls_senders, a);
        added = TRUE;
        }
        /* couldn't recycle an old record, so make a new one */
        if !added)
        {
            a =arena_zalloc(main_arena, sizeof(struct address));
            a->addr_addr = string new(main_arena, pfc->ctx_sender);
            a->addr_when = now;
            vector_append(pfc->ctx_class->cls_senders, a);
        }
}
/* unlock the class */
(void) smutex_unlock(&pfc->ctx_class->cls_lock);
/* identify the filter, if requested */
if (addxhdr)
{
String xfhdr;
xfhdr = string_alloc(pfc->ctx_arena, 0);
string_printf(xfhdr, "%s v%s %s %s", PF_PF_PRODUCT,
PF_VERSION,
    hostname,
    pfc->ctx_msgid NULL ? pfc->ctx_msgid
                        :MSGIDUNKNOWN);
if (smfi_addheader(ctx, XHEADERNAME,
        string_get_data (xfhdr)) != MI_SUCCESS)
{
    if (dolog)
        syslog(LOG_ERR, "smfi_addheader ( ) failed");
    pf_cleanup(ctx);
    return SMFIS_TEMPFAIL;
}
}
/* Implement disposition */
ret = SMFIS_ACCEPT;
if (pf_atlimit (pfc->ctx_class))
    pf_failmsg(pfc->ctx_class, &ret);
if (ret == SMFIS_ACCEPT && dolog)
```

APPENDIX A: SOURCE CODE LISTINGS -continued

```
    syslog(LOG_INFO, "%s accepted", pfc->ctx_msgid);
    /* s'all good */
    pf_cleanup(ctx);
    return ret;
}
```

What is claimed is:

1. In an electronic mail (e-mail) system, a method for processing an incoming e-mail message that is being received from another domain, the method comprising:
receiving at a first process a request from a particular domain to establish a new connection for transmitting a particular e-mail message to the e-mail system;
in response to receipt of said request from the particular domain, creating a second process for handling the request to establish a new connection, said second process being connected to a flow control filter providing filtering on a per-domain basis;
comparing the request from the particular domain against configurable policy rules; and
denying the request if any of said policy rules would be violated.

2. The method of claim 1, wherein said configurable policy rules specify a maximum number of connections permitted by a given domain over a user-configurable period of time.

3. The method of claim 2, wherein said user-configurable period of time is configurable to a desired period of time.

4. The method of claim 1, further comprising:
if none of said policy rules would be violated, permitting the requested connection and incrementing a counter indicating how many connections have been granted to the particular domain.

5. The method of claim 4, further comprising:
after passage of the user-configurable period of time, resetting the counter.

6. The method of claim 1, further comprising:
permitting the requested connection;
receiving sender information about the particular e-mail message from the particular domain;
comparing the sender information from the particular domain against said configurable policy rules; and
blocking receipt of the incoming e-mail message if any of said policy rules would be violated.

7. The method of claim 6, wherein said sender information is transmitted during a "MAIL FROM" phase of SMTP (Simple Mail Transport Protocol) processing.

8. The method of claim 6, wherein said configurable policy rules specify a maximum number of different senders permitted by a given domain over a user-configurable period of time.

9. The method of claim 1, further comprising:
permitting the requested connection;
receiving recipient information about the particular e-mail message from the particular domain;
comparing the recipient information from the particular domain against said configurable policy rules; and
blocking receipt of the incoming e-mail message if any of said policy rules would be violated.

10. The method of claim 9, wherein said recipient information is transmitted during a "RCPT TO" phase of SMTP (Simple Mail Transport Protocol) processing.

11. The method of claim 9, wherein said configurable policy rules specify a maximum number of different recipients permitted by a given domain over a user-configurable period of time.

12. The method of claim 1, further comprising:
permitting the requested connection;
receiving e-mail message body data about the particular e-mail message from the particular domain;
comparing the e-mail message body data from the particular domain against said configurable policy rules; and
blocking receipt of the incoming e-mail message if any of said policy rules would be violated.

13. The method of claim 12, wherein said e-mail message body data is transmitted during a "DATA" phase of SMTP (Simple Mail Transport Protocol) processing.

14. The method of claim 12, wherein said configurable policy rules specify a maximum aggregate volume of e-mail permitted by a given domain over a user-configurable period of time.

15. The method of claim 14, wherein said maximum aggregate volume is based on total byte count of e-mail received from a given domain over a user-configurable period of time.

16. The method of claim 1, wherein said first process comprises a mail transport agent (MTA) process.

17. The method claim 16, wherein said second process comprises a child mail transport agent (MTA) process.

18. The method of claim 1, wherein said second process is created from said first process via a forking operation.

19. The method of claim 18, wherein said second process is initially created as a copy of said first process.

20. The method of claim 1, further comprising:
creating a multitude of new processes for handling multiple requests to establish new connections, each new process being connected to said flow control filter providing filtering on a per-domain basis.

21. An electronic mail (e-mail) system providing filtering of incoming e-mail messages on a per-domain basis, the system comprising:
a parent process for receiving requests from different domains to establish new connections for transmitting e-mail messages;
a plurality of child processes for handling the requests to establish new connections and for handling subsequent requests for transmitting e-mail messages;
a set of rules specifying conditions for accepting requests for new connections and for accepting requests for transmitting e-mail messages; and
a flow control filter, in communication wit said child processes and said set of rules, providing filtering based on each domain's conformance to said rules.

22. The system of claim 21, wherein said parent process and said child processes comprise mail transport agent (MTA) processes.

23. The system claim 21, wherein each said child process is created from the parent process via a forking operation.

24. The system of claim 21, wherein each said child process is initially created as a copy of said parent process.

25. The system of claim 21, wherein said set of rules comprises a configurable set of rules.

26. The system of claim 21, wherein said set of rules comprises a set of rules stored in a text-based configuration file.

27. The system of claim 21, wherein said set of rules comprises user-created class definitions specifying different classes of domains.

28. The system of claim 27, wherein each said class definition includes a domain name corresponding to a particular domain that is to be monitored for filtering.

29. The system of claim 27, wherein each said class definition includes limits tat a particular domain must adhere to over a given user-configurable period of time.

30. The system of claim 29, wherein said limits include selected ones of:
maximum number of different senders,
maximum number of different recipients,
maximum number of connections,
maximum number of envelopes, and
maximum aggregate volume of mail.

31. The system of claim 21, wherein a given domain is not filtered if a corresponding rule has not been created for that given domain.

32. The system of claim 21, wherein said flow control filter denies a given domain's request for a new connection if any of said rules would be violated by granting the request.

33. The system of claim 21, wherein said requests for transmitting e-mail messages comprise SMTP (Simple Mail Transport Protocol) commands submitted to the e-mail system from different domains.

34. The system of claim 33, wherein said flow control filter processes said SMTP commands received from different domains to ascertain whether any of said rules would be violated.

35. The system of claim 34, wherein said SMTP commands include a "MAIL FROM" command specifying sender information for a given e-mail message.

36. The system of claim 35, wherein said flow control filter examines said sender information to ascertain whether any of said rules would be violated.

37. The system of claim 34, wherein said SMTP commands include a "RCPT TO" command specifying recipient information for a given e-mail message.

38. The system of claim 37, wherein said flow control filter examines said recipient information to ascertain whether any of said rules would be violated.

39. The system of claim 34, wherein said SMTP commands include a "DATA" command specifying e-mail message body data for a given e-mail message.

40. The system of claim 39, wherein said flow control filter examines said e-mail message body data to ascertain whether any of said rules would be violated.

41. In an electronic mail (e-mail) system, a method for processing incoming e-mail messages that are being received from different domains, the method comprising:
receiving requests from different domains to establish new connections for transmitting e-mail messages to the e-mail system;
for each request received in connection with transmitting a given e-mail message, performing substeps of:
identifying a particular domain that has submitted the request,
based on the determined identity of the domain, determining whether the request to establish a new connection can be granted without violating policy rules, and
based on the determined identity of the domain, determining whether subsequent requests to transmit different portions of a given e-mail message can be granted without violating said policy rules.

42. The method of claim 41, wherein said step of determining whether the request to establish a new connection can be granted includes:

determining a maximum number of connections permitted for the particular domain over a user-configurable period of time; and determining whether the particular domain would exceed said maximum number of connections if the request were granted.

43. The method of claim 41, wherein said step of determining whether subsequent requests to transmit different portions of a given e-mail message can be granted includes:

determining a maximum number of different senders permitted for the particular domain over a user-configurable period of time; and determining whether the particular domain would exceed said maximum number of different senders if the request were granted.

44. The method of claim 41, wherein said step of determining whether subsequent requests to transmit different portions of a given e-mail message can be granted includes:

determining a maximum number of different recipients permitted for the particular domain over a user-configurable period of time; and determining whether the particular domain would exceed said maximum number of different recipients if the request were granted.

45. The method of claim 41, wherein said step of determining whether subsequent requests to transmit different portions of a given e-mail message can be granted includes:

determining a maximum number of different e-mail envelopes permitted for the particular domain over a user-configurable period of time; and determining whether the particular domain would exceed said maximum number of different e-mail envelopes if the request were granted.

46. The method of claim 41, wherein said step of determining whether subsequent requests to transmit different portions of a given e-mail message can be granted includes:

determining a maximum aggregate volume of e-mail permitted for the particular domain over a user-configurable period of time; and determining whether the particular domain would exceed said maximum aggregate volume of e-mail if the request were granted.

47. The method of claim 41, further comprising:

if the request to establish a new connection cannot be granted without violating said policy rules, denying the request.

48. The method of claim 47, further comprising:

returning an error code indicating why the request is denied.

49. The method of claim 41, further comprising:

if the request to transmit different portions of a given e-mail message cannot be granted without violating said policy rules, denying the request.

50. The method of claim 41, wherein portions of a given e-mail message include sender information, recipient information, and message body data.

51. The method of claim 41, wherein said policy rules are configurable.

52. The method of claim 41, wherein said policy rules comprise user-edited rules created for different domains.

53. The method of claim 52, wherein each user-edited rule comprises a host class definition specifying a particular domain and corresponding limits to be applied against that domain over a user-configurable period of time.

* * * * *